United States Patent
He et al.

(10) Patent No.: US 7,583,569 B2
(45) Date of Patent: Sep. 1, 2009

(54) APPARATUS AND RELATED METHOD FOR GENERATING A TRACKING ERROR SIGNAL IN AN OPTICAL DISC DRIVE

(75) Inventors: Wei-Hung He, Taipei Hsien (TW); Kuang-Yu Yen, Tai-Chung (TW)

(73) Assignee: Realtek Semiconductor Corp., HsinChu (TW)

( * ) Notice: Subject to any disclaimer, the term of this patent is extended or adjusted under 35 U.S.C. 154(b) by 622 days.

(21) Appl. No.: 11/163,439

(22) Filed: Oct. 19, 2005

(65) Prior Publication Data

US 2006/0023580 A1    Feb. 2, 2006

Related U.S. Application Data

(63) Continuation-in-part of application No. 11/160,820, filed on Jul. 12, 2005, now Pat. No. 7,512,043.

(30) Foreign Application Priority Data

| Jul. 8, 2004 | (TW) | ............................. 93120463 A |
| Jul. 22, 2004 | (TW) | ............................. 93121904 A |
| Oct. 28, 2004 | (TW) | ............................. 93132759 A |

(51) Int. Cl.
*G11B 7/00* (2006.01)
(52) U.S. Cl. .................... 369/44.34; 369/44.11
(58) Field of Classification Search ............... 369/44.11
See application file for complete search history.

(56) References Cited

U.S. PATENT DOCUMENTS

| 4,785,441 A | 11/1988 | Tanaka et al. |
| 5,060,216 A | 10/1991 | Suzuki et al. |
| 5,117,408 A | 5/1992 | Weispfenning |
| 5,666,341 A | 9/1997 | Horibe |
| 5,956,304 A | 9/1999 | Supino et al. |
| 6,137,755 A | 10/2000 | Bakx et al. |
| 6,236,628 B1 * | 5/2001 | Kim .......................... 369/44.41 |
| 6,266,305 B1 | 7/2001 | Buchler |
| 6,504,799 B1 | 1/2003 | Yamashita |
| 6,741,532 B1 | 5/2004 | Graba |
| 6,741,533 B1 | 5/2004 | Hiratsuka |
| 6,781,932 B2 * | 8/2004 | Beatson ..................... 369/44.41 |
| 6,937,542 B1 | 8/2005 | Ogawa |
| 6,954,709 B2 | 10/2005 | Mashimo |
| 7,161,877 B2 | 1/2007 | Lai |

(Continued)

FOREIGN PATENT DOCUMENTS

CN    1321304 A    11/2001

(Continued)

*Primary Examiner*—Wayne R Young
*Assistant Examiner*—Lixi Chow
(74) *Attorney, Agent, or Firm*—Winston Hsu

(57) ABSTRACT

The present invention discloses an apparatus for generating a tracking error signal in an optical disc drive. The disclosed apparatus includes: an analog-to-digital conversion module for receiving a plurality of analog signals generated by accessing an optical disc and for converting the plurality of analog signals into a plurality of digital signals with a sampling rate; a frequency control module coupled to the analog-to-digital conversion module for adjusting the sampling rate according to the plurality of digital signals; and a signal generation module coupled to the analog-to-digital conversion module for generating the tracking error signal according to the plurality of digital signals.

11 Claims, 4 Drawing Sheets

U.S. PATENT DOCUMENTS

| | | |
|---|---|---|
| 7,295,498 B2 | 11/2007 | Nakano |
| 2003/0046037 A1 | 3/2003 | Mashimo |
| 2003/0107961 A1 | 6/2003 | Yasuda |
| 2003/0202438 A1 | 10/2003 | Nomoto |
| 2004/0081040 A1* | 4/2004 | Yamamoto et al. ....... 369/44.34 |
| 2004/0151089 A1 | 8/2004 | Buchler |
| 2004/0160250 A1 | 8/2004 | Kim |
| 2004/0196755 A1 | 10/2004 | Cheng |

FOREIGN PATENT DOCUMENTS

| | | |
|---|---|---|
| CN | 1133991 C | 1/2004 |
| TW | 513716 | 12/2002 |

* cited by examiner

APPARATUS AND RELATED METHOD FOR GENERATING A TRACKING ERROR SIGNAL IN AN OPTICAL DISC DRIVE

CROSS REFERENCE TO RELATED APPLICATIONS

This is a continuation-in-part of U.S. application Ser. No. 11/160,820, which was filed on Jul. 12, 2005, and is included herein by reference.

BACKGROUND OF THE INVENTION

1. Field of the Invention

The present invention relates to an optical disc drive, and more particularly, to an apparatus and related method for generating a tracking error signal in the optical disc drive.

2. Description of the Prior Art

A servo system in an optical disc drive needs to utilize a tracking error signal TE for dynamically controlling a laser diode of a pick-up head (PUH) to output a laser beam to an optical disc track. The conventional method utilizes an optical sensor on the PUH to sense a reflected beam from the optical disc to generate a plurality of analog signals, utilizes an ADC to convert the plurality of analog signals to a plurality of digital signals with a specific sampling rate, and then generates the tracking error signal for the servo system.

However, quality of the tracking error signal relates to the sampling rate of the ADC. If the ADC converts the plurality of analog signals to a plurality of digital signals with a fixed sampling rate, quality of the tracking error signal is not always the same when different tracks on the optical disc are read or the reading condition changes.

Additionally, the conventional method generates the tracking error signal according to four signals A, B, C, D detected from the optical sensor. For example, the tracking error signal can be generated by subtracting a phase difference between the signals A and B from a phase difference between the signals C and D.

However, the phase difference value between the signals A and B and the phase difference value between the signals C and D are not equally important in every situation. When one is more important than the other, the synthesis method with equal weighting factors for generating the tracking error signal is not the optimal method to represent the tracking error information.

SUMMARY OF THE INVENTION

One objective of the claimed invention is therefore to provide an apparatus for dynamically adjusting a sampling rate utilized by an ADC when a tracking error signal is being generated, to solve the above-mentioned problems.

According to an exemplary embodiment of the claimed invention, an apparatus is disclosed for generating a tracking error signal in an optical disc drive. The apparatus comprises: an analog-to-digital conversion module for receiving a plurality of analog signals generated by accessing an optical disc and for converting the plurality of analog signals to a plurality of digital signals according to a sampling rate; a frequency control module coupled to the analog-to-digital conversion module for adjusting the sampling rate according to the plurality of digital signals; and a signal generation module coupled to the analog-to-digital conversion module for generating the tracking error signal according to the plurality of digital signals.

According to another exemplary embodiment of the claimed invention, a method is disclosed for generating a tracking error signal in an optical disc drive. The method comprises: receiving a plurality of analog signals generated by accessing an optical disc and converting the plurality of analog signals to a plurality of digital signals according to a sampling rate; adjusting the sampling rate according to the plurality of digital signals; and generating the tracking error signal according to the plurality of digital signals.

According to another exemplary embodiment of the claimed invention, an apparatus is disclosed for generating a tracking error signal in an optical disc drive. The apparatus comprises: an analog-to-digital conversion module for receiving a plurality of analog signals generated by accessing an optical disc and converting the plurality of analog signals to a plurality of digital signals according to a sampling rate; a frequency control module coupled to the analog-to-digital conversion module for adjusting the sampling rate according to the plurality of digital signals; a signal generation module coupled to the analog-to-digital conversion module for generating an error signal according to the plurality of digital signals; a quality detection module coupled to the signal generation module for generating a quality detection signal according to the error signal; and a signal mix module coupled to the signal generation module and the quality detection module for generating the tracking error signal according to the error signal and the quality detection signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
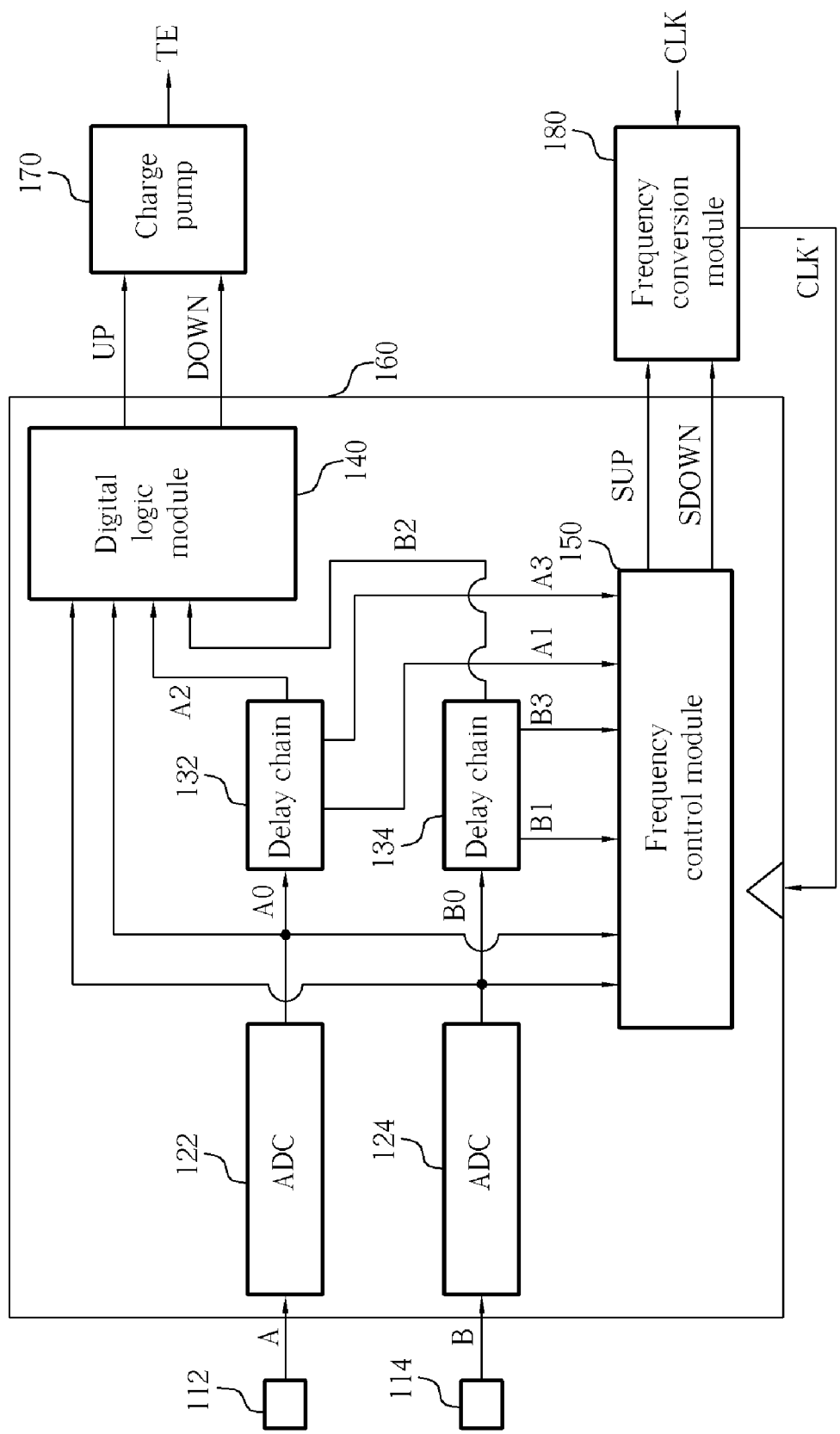
FIG. 1 is a diagram of an apparatus according to an embodiment of the present invention.

FIG. 1 shows a diagram of an apparatus according to an embodiment of the present invention. The present embodiment apparatus can be applied to an optical disc drive for generating a tracking error signal TE. The apparatus of this embodiment includes an optical detection module, an analog-to-digital conversion module (ADC module), a frequency control module 150, and a signal generation module. The optical detection module comprises a first optical sensor 112 and a second optical sensor 114 for respectively generating a first analog signal A and a second analog signal B according to a light beam reflected off an optical disc. The analog signals A and B can first be processed by AC coupling capacitors, equalizers, and low pass filters (LPF), and then be inputted into the analog-to-digital conversion module. The analog-to-digital conversion module includes a first ADC 122 and a second ADC 124 for respectively converting the analog signals A and B into a first digital signal A0 and a second digital signal B0 by a sampling rate 1/Ts, which is a frequency of a clock signal CLK' of FIG. 1. The signal generation module includes a delay module with a first delay chain 132 and a second delay chain 134, a third digital logic module 140, and a charge pump 170 for generating the tracking error signal TE according to digital signals A0 and B0. The digital apparatus 160 of the present embodiment apparatus can operate under the clock signal CLK' provided by a frequency conversion module 180 such as a phase locked loop. In other words, the frequency of the clock signal CLK' is the operation frequency of the digital apparatus 160 and the sampling rates of the ADCs 122 and 124. The frequency control module 150 can control the frequency conversion module 180 to dynamically change the frequency of the clock signal CLK'. Then the ADCs 122 and 124 can utilize a better sampling rate 1/Ts to convert digital data into analog data.

In the present embodiment, the delay chain 132 delays the digital signal A0 by times Ts, 2Ts, 3Ts respectively to generate a first delay signal A1, a second delay signal A2, and a third delay signal A3. The delay chain 134 delays the digital signal B0 by times Ts, 2Ts, 3Ts respectively to generate a fourth delay signal B1, a fifth delay signal B2, and a sixth delay signal B3. The digital logic module 140 generates a charging signal UP and a discharging signal DOWN according to the digital signals A0, B0 and the delay signals A2, B2. The charge pump generates the tracking error signal TE according to the charging signal UP and the discharging signal DOWN.

The digital signals A0 and B0 and the delay signals A1, A2, A3, B1, B2, B3 of the present embodiment are all 1-bit digital signals. For the digital logic module 140, if the value of a signal among the four signals A0, B0, A2, B2 differs from the values of the other three signals, the digital logic module 140 determines that there is a phase difference between the analog signals A and B. At this moment, the level of the tracking error signal TE can be adjusted through the charging signal UP or the discharging signal DOWN. In other words, when the value of the signal A0 differs from values of the signals A2, B0, and B2, or when the value of the signal B2 differs from the values of signals A0, A2, and B0, the digital logic module 140 triggers the charging signal UP to increase the level of the tracking error signal TE through the charge pump 170. When the value of the signal A2 differs from values of the signals A0, B0, and B2, or when the value of the signal B0 differs from the values of signals A0, A2, and B2, the digital logic module 140 triggers the discharging signal DOWN to decrease the level of the tracking error signal TE through the charge pump 170. In the present embodiment, the digital logic module 140 can operate according to a truth table satisfying the above-mentioned conditions.

Figure 2:
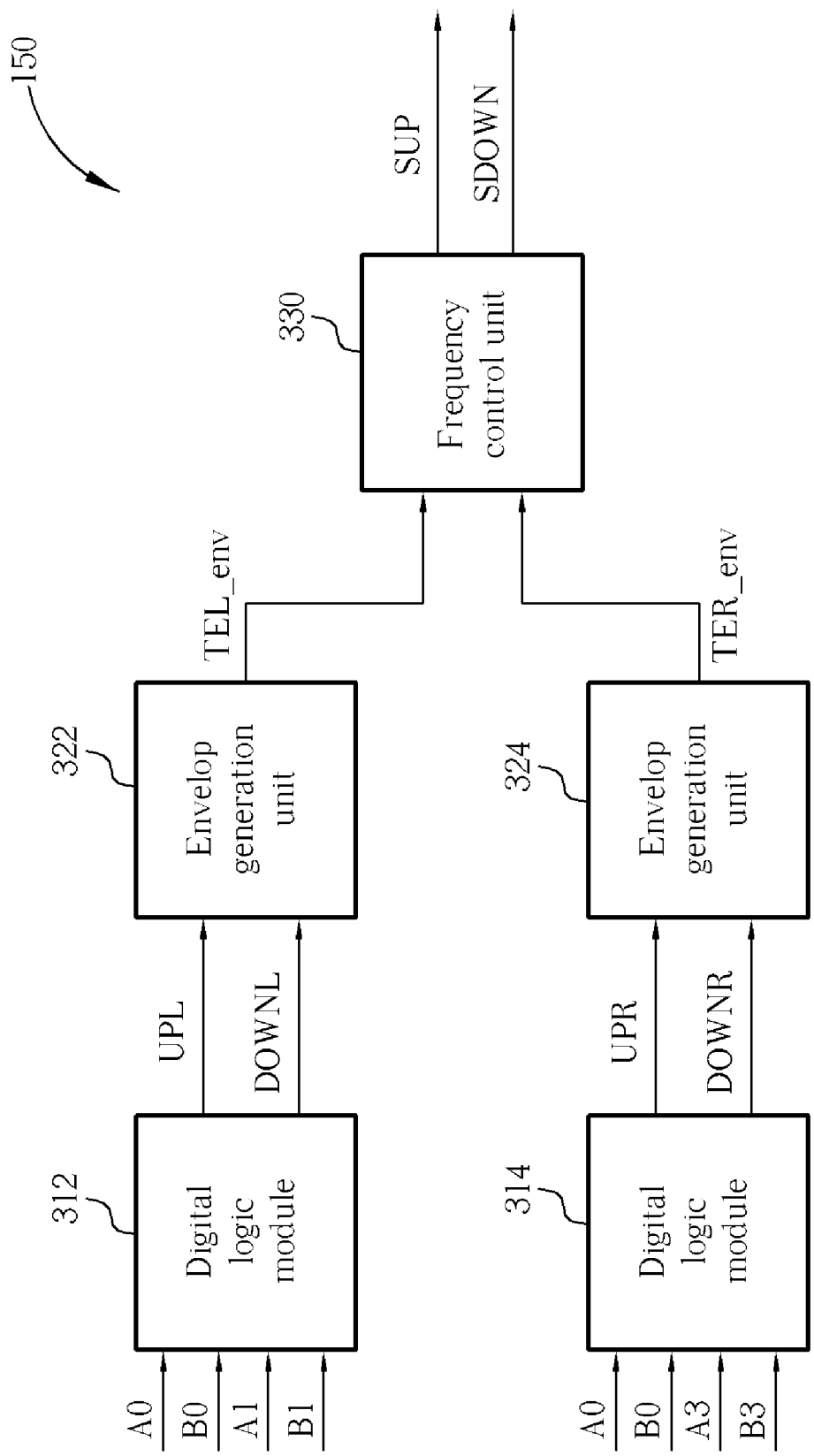
FIG. 2 is a detailed diagram illustrating the operation of the frequency control module of FIG. 1.

FIG. 2 shows a detailed diagram illustrating the operation of the frequency control module 150 of FIG. 1. The frequency control module 150 includes a first detection module consisting of a first digital logic module 312 and a first envelope generation unit 322 and a second detection module consisting of a second digital logic module 314 and a second envelope generation unit 324. The first detection module generates a first detection value TEL_env according to the first and second digital signals A0 and B0 as well as the first and fourth delay signals A1 and B1. The second detection module generates a second detection value TER_env according to the first and second digital signals A0 and B0 as well as the third and sixth delay signals A3 and B3.

The operation of the digital logic module 312 is similar to the above mentioned digital logic module 140. The first control signal UPL or the second control signal DOWNL is triggered when the value of a signal among the four signals A0, B0, A1, B1 differs from the other three signals. In other words, when the value of the signal A0 differs from values of the signals A1, B0, and B1, or when the value of the signal B1 differs from the values of signals A0, A1, and B0, the digital logic module 312 triggers the control signal UPL. When the value of the signal A1 differs from values of the signals A0, B0, and B1, or when the value of the signal B0 differs from the values of signals A0, A1, B1, the digital logic module 312 triggers the control signal DOWNL.

Figure 3:
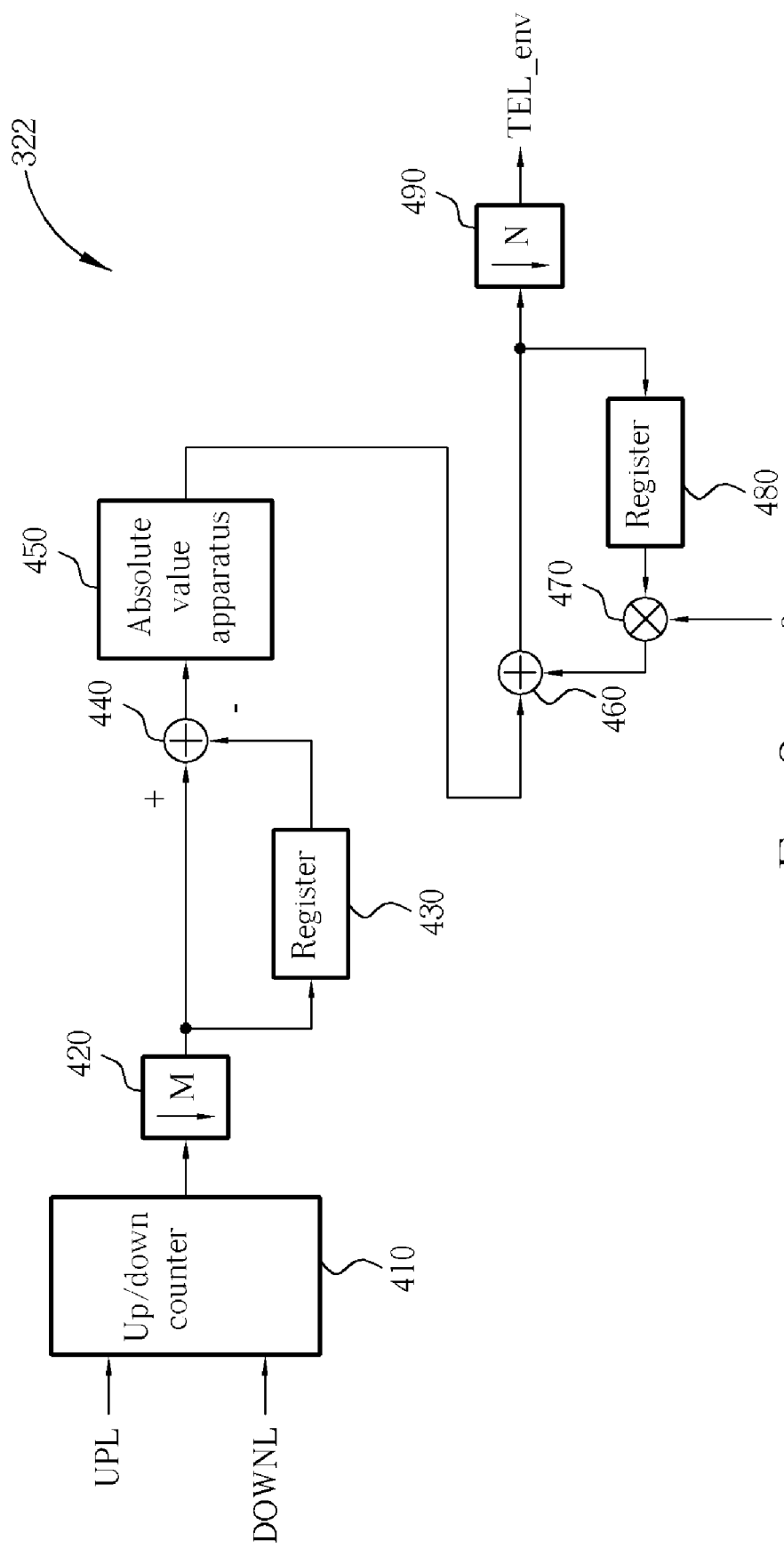
FIG. 3 is a detailed diagram illustrating the operation of the envelope generation unit of FIG. 2.

If the control signal UPL and the control signal DOWNL are utilized to control an extra charge pump, the charge pump will generate a signal TEL, which is similar to the tracking error signal TE. The functionality of the envelope generation unit 322 is to generate an envelope of possible signal TEL, which is the first detection value TEL_env, according to the control signal UPL and the control signal DOWNL. FIG. 3 shows a detailed diagram illustrating the operation of the envelope generation unit 322 of FIG. 2. The operation of the envelope generation unit 322 comprises an up/down counter 410, a first decimator 420, a first register 430, a first adder 440, an absolute value apparatus 450, a second adder 460, a mixer 470, a second register 480, and a second decimator 490. As the operation of the apparatus shown in FIG. 3 is known to those skilled in the art, further discussion is omitted for the sake of brevity. The functionality of the envelope generation unit 324 is similar to the envelope generation unit 322 and the architecture can also be shown as FIG. 3 but is not meant to be taken as a limitation of the present invention.

When the first detection value TEL_env is larger than the second detection value TER_env, the quality of the tracking error signal TE generated from the signal generation module can be improved by increasing the operation frequency 1/Ts of the digital apparatus 160 (i.e. increasing the frequency of the clock signal CLK'). At this moment, the frequency control unit 330 of FIG. 2 triggers a fifth control signal SUP to increase the frequency of the clock signal CLK' by the frequency conversion module 180 in FIG. 1. When the first detection value TEL_env is smaller than the second detection value TER_env, the quality of the tracking error signal TE generated from the signal generation module can be improved by decreasing the operation frequency 1/Ts of the digital apparatus 160. At this moment, the frequency control unit 330 of FIG. 2 triggers a sixth control signal DOWNS to decrease the frequency of the clock signal CLK' by the frequency conversion module 180 in FIG. 1.

Please note that in the embodiment shown in FIG. 1, the signals inputted into the ADC 122 and the ADC 124 are the signals A and B respectively from the optical sensor. In fact, the two signals can also be the signal C and the signal D from the optical sensor respectively, or be the signal (A+C) and the signal (B+D). Additionally, the present invention apparatus and related method can also be utilized in U.S. Patent Publication No. 2006/0007808, apparatus for generating a tracking error signal in an optical disc drive, which was filed on September, 2005. Besides dynamically adjusting the sampling rate utilized by the ADC, generating a first candidate tracking error signal TEAB according to the signal A and the signal B, and generating a second candidate tracking error signal TECD according to the signal C and the signal D, an extra quality detection module is utilized to determine respectively the quality of the first and second candidate tracking error signals TEAB, TECD to generate the tracking error signal TE needed according to the first and second candidate tracking error signals TEAB, TECD. Please refer to the above-mentioned U.S. Patent Publication to obtain the detailed description of the quality detection module.

Figure 4:
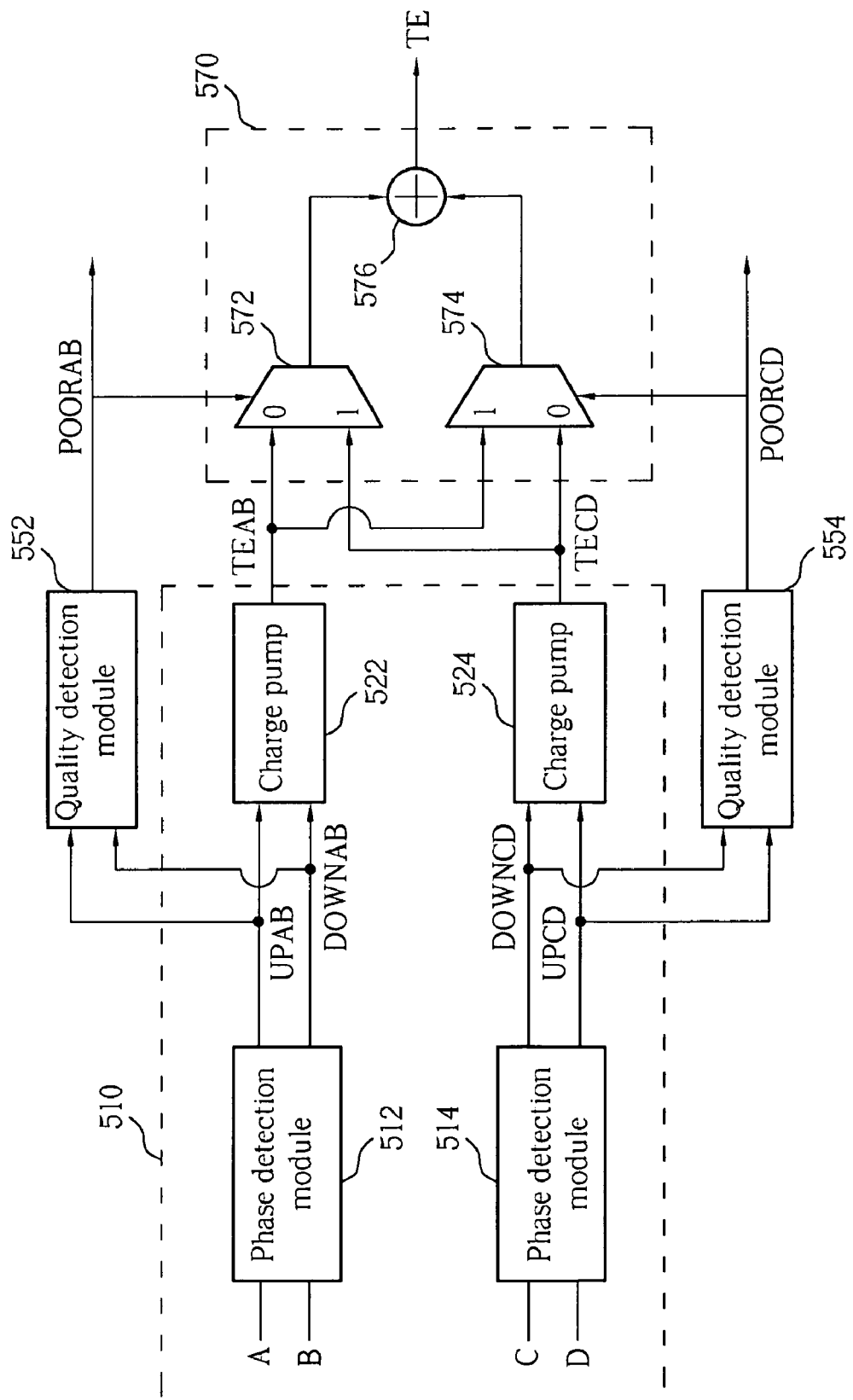
FIG. 4 is a diagram of a tracking error signal generating apparatus.

Please refer to FIG. 4. FIG. 4 shows a diagram of a tracking error signal generating apparatus according to an embodiment of the present invention. The inventive apparatus can be applied to an optical disc drive for generating a tracking error signal TE. The apparatus of this embodiment comprises a signal generation module 510, a quality detection module, which is comprised of a first quality detector 552 and a second quality detector 554, and a signal-synthesizing module 570. The signal generation module 510 generates a first candidate tracking error signal TEAB and a second candidate tracking error signal TECD according to a light beam reflected off an optical disc. The quality detectors 552 and 554 respectively detect quality of the candidate tracking error signals TEAB and TECD to generate a first indication signal POORAB and a second indication signal POORCD. In this embodiment, the quality detector 552 triggers the indication signal POORAB when inferior quality in the signal TEAB is detected, and the quality detector 554 triggers the indication signal POORCD when inferior quality in the signal TECD is detected. The signal-synthesizing module 570 is controlled by the indication signals POORAB and POORCD for selectively generating the resulting tracking error signal TE according to the candidate tracking error signals TEAB and TECD. The signal generation module 510 of the present embodiment comprises an optical sensing module (not shown), a first phase detection module 512, a first charge pump 522, a second phase detection module 514, and a second charge pump 524. The optical sensing module is utilized to sense the above-mentioned light beam reflected off an optical disc to generate a first, second, third, and fourth analog signal A, B, C, and D, respectively. As known to those skilled in the art of optical disc drives, the four analog signals A, B, C, and D can first be processed by AC coupling capacitors, equalizers, and low pass filters (LPF), and then inputted into the phase detection modules 512 and 514.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for generating a tracking error signal comprising:
   an analog-to-digital conversion module for receiving a plurality of analog signals generated by accessing an optical disc and converting the plurality of analog signals to a plurality of digital signals according to a sampling rate;
   a frequency control module coupled to the analog-to-digital conversion module for adjusting the sampling rate according to the plurality of digital signals; and
   a signal generation module coupled to the analog-to-digital conversion module for generating the tracking error signal according to the plurality of digital signals;
   wherein the frequency control module comprises:
      at least a detection module coupled to the analog-to-digital conversion module for generating at least a detection value according to the plurality of digital signals and a plurality of delay signals, wherein the detection value comprises a first detection value and a second detection value and the plurality of delay signals are generated according to the plurality of digital signals; and
      a frequency control unit coupled to the detection module for increasing or decreasing the sampling rate by comparing the first and second detection value.

2. The apparatus of claim 1, wherein the detection module comprises:
   a digital logic module coupled to the analog-to-digital conversion module for generating a plurality of control signals according to the plurality of digital signals and the plurality of delay signals; and
   an envelope generation unit coupled to the digital logic module for generating the detection value according to the plurality of control signals.

3. The apparatus of claim 2, wherein the digital logic module is utilized for determining values of the plurality of control signals according to a truth table.

4. The apparatus of claim 1, wherein the signal generation module comprises:
   a delay module coupled to the analog-to-digital conversion module for delaying the plurality of digital signals to generate the plurality of delay signals;
   a digital logic module coupled to the analog-to-digital conversion module and the delay module for generating at least one increasing signal and at least one decreasing signal according to the plurality of digital signals and the plurality of delay signals; and
   an output unit coupled to the digital logic module for generating the tracking error signal according to the increasing signal and the decreasing signal.

5. The apparatus of claim 4, wherein the digital logic module is utilized to determine values of the increasing and decreasing signals according to a truth table.

6. The apparatus of claim 1 further comprising:
   a frequency conversion module coupled to the frequency control module for converting a frequency of an external clock to the sampling rate according to the plurality of digital signals.

7. A method for generating a tracking error signal, the method comprising:
   receiving a plurality of analog signals generated by accessing an optical disc and converting the plurality of analog signals to a plurality of digital signals according to a sampling rate;
   adjusting the sampling rate according to the plurality of digital signals; and
   generating the tracking error signal according to the plurality of digital signals;
   wherein the step of generating the tracking error signal further comprises:
      generating a plurality of delay signals according to the plurality of digital signals;
      generating at least one increasing signal and at least one decreasing signal according to the plurality of digital signals and the plurality of delay signals; and
      generating the tracking error signal according to the increasing signal and the decreasing signal.

8. The method of claim 7, wherein the step of adjusting the sampling rate further comprises:
   generating a plurality of delay signal according to the plurality of digital signals;
   generating a plurality of detection values according to the plurality of digital signals and the plurality of delay signals; and
   adjusting the sampling rate by comparing the plurality of detection values.

9. The method of claim 7, wherein the step of generating the increasing signal and the decreasing signal further comprises determining values of the increasing and decreasing signals according to a truth table.

10. An apparatus for generating a tracking error signal comprising:
    an analog-to-digital conversion module, for receiving a plurality of analog signals generated by accessing an optical disc and converting the plurality of analog signals to a plurality of digital signals according to a sampling rate;

a frequency control module, coupled to the analog-to-digital conversion module, for adjusting the sampling rate according to the plurality of digital signals; and a signal generation module, coupled to the analog-to-digital conversion module, for generating the tracking error signal according to the plurality of digital signals;

wherein the frequency control module comprises:

a digital logic module, coupled to the analog-to-digital conversion module, for generating a plurality of control signals according to the plurality of digital signals and a plurality of delay signals, wherein the plurality of delay signals are generated according to the plurality of digital signals;

an envelope generation unit, coupled to the digital logic module, for generating a detection value according to the plurality of control signals; and a frequency control unit, coupled to the envelope generation unit, for adjusting the sampling rate according to the detection value.

11. An apparatus for generating a tracking error signal comprising:

an analog-to-digital conversion module for receiving a plurality of analog signals generated by accessing an optical disc and converting the plurality of analog signals to a plurality of digital signals according to a sampling rate;

a frequency control module coupled to the analog-to-digital conversion module for adjusting the sampling rate according to the plurality of digital signals; and a signal generation module coupled to the analog-to-digital conversion module for generating the tracking error signal according to the plurality of digital signals;

wherein the signal generation module comprises:

a delay module coupled to the analog-to-digital conversion module for delaying the plurality of digital signals to generate the plurality of delay signals;

a digital logic module coupled to the analog-to-digital conversion module and the delay module for generating at least one increasing signal and at least one decreasing signal according to the plurality of digital signals and the plurality of delay signals; and an output unit coupled to the digital logic module for generating the tracking error signal according to the increasing signal and the decreasing signal.

* * * * *